: 2,734,002
Patented Feb. 7, 1956

2,734,002

RESIN-COATED POTASSIUM SALTS AND METHOD OF MAKING THE SAME

Edmund A. Schoeld and Clarence W. Egbom, Carlsbad, N. Mex., assignors to Potash Company of America, Carlsbad, N. Mex., a corporation of Colorado No Drawing. Application August 31, 1953, Serial No. 377,680

10 Claims. (Cl. 117—100)

This invention relates to a process and a product thereof for treating crystalline and granular products to prevent or reduce the tendency of the products to form hard cakes on storage.

Many chemical salts are hygroscopic, that is, they will absorb moisture under moist atmospheric conditions, and generally release it under dry atmospheric conditions. This phenomenon leads to solution and crystallization of the salts, which tends to build crystalline bridges between the individual particles. As the crystal bridges build up between the various individual particles, the chemical salts form hard cakes, which, generally, reduces the usefulness of the chemical salt. The caking tendency of the chemical salt reduces the possibility of storing the salts, therefore, making an extremely burdensome handling problem, since such salts can only be stored for immediate use. Crystalline or granular chemical salts are subject to the effects of hygroscopicity.

According to the present invention, the individual particles of the chemical salt are covered with a thin coating of plastic which provides surface protection of the exposed surfaces of each individual particle. In one preferred form, urea-formaldehyde resins have been found to be particularly valuable for coating various soluble crystalline salts, and in particular, potash salts.

It is an object of the present invention to provide a process of treating crystalline or granular salts for the prevention or reduction of the tendency to form hard cakes of the salts on storage.

It is another object of the present invention to provide a thin plastic coating for crystalline or granular salts to prevent the forming of hard cakes of the salts in storage.

It is a still further object of the present invention to provide a process for treating chemical salts to prevent or reduce caking tendencies thereof which is simple and efficient, and greatly enhances the value of the chemical salts.

These and other objects and advantages will be apparent as the description of the invention proceeds below.

In one preferred form, urea-formaldehyde resins are used to coat the chemical salt particles with an extremely thin plastic coating to prevent water or moisture absorption. Urea-formaldehyde is advantageously used since the ingredients, that is, urea and formaldehyde, are very soluble in water, and the solution may be applied as a concentrated water solution on the salt particles. The resin ingredients may be applied as a separate water solution of each of the ingredients, or the solutions may be mixed and applied together.

The urea-formaldehyde resins have been found to be of particular value on crystalline or granular potassium salts which are hygroscopic, including potassium muriate, potassium chloride, which is used for fertilizer purposes. Tests on the rates of moisture absorption of treated and untreated samples of the salts show a substantially lower rate of moisture absorption for the urea-formaldehyde treated samples. The main advantage of the physical characteristics of the material lies in the fact that the urea-formaldehyde treated product remains loose and friable even after cycles of moist and dry atmosphere, as compared with the caked condition of the untreated product subjected to the same treatment.

In the use of the urea-formaldehyde resin, a solution of the mixture of urea and formaldehyde may be made slightly alkaline to inhibit chemical reaction and thus keep the solution for some time before application to the chemical salt. Salts, and particularly potassium chloride, are accelerators for the condensation of urea and formaldehyde. Acid also is an accelerator for the condensation of the urea and formaldehyde. When a solution of urea and formaldehyde is applied to potassium chloride crystals, the accelerating or catalytic action occurs at the surfaces of the crystals or particles so that the polymerization occurs on the surface of the individual particles. Furthermore, by drying the treated potassium chloride in a combustion fired rotary drier, the combustion products, which contain carbon dioxide, are acidic and they neutralize the alkalinity of the urea-formaldehyde solution to further assist in the polymerization of the resin on the surface on the individual particles. In the treatment of a "fine" fraction of a salt product, the present invention provides or increases the tendency of the small particles or fine to agglomerate thus reducing the tendency to dust when handled. The agglomerated granules thus produced are of sufficient strength to permit the required handling, without excessive dusting.

In the preparation of the urea-formaldehyde resin, an equal weight of urea and formaldehyde gives very good results, and preparations using formaldehyde from one-half weight to one and one-half times the weight of urea are also effective.

Various methods of preparation of the solutions may be used. Solutions of different strengths of the chemicals are useful, but a 25% solution in water is a preferred preparation, since it is easy to handle and the added amount of water does not add much to the drying load of the drier.

The following example in detail describes the use of the urea-formaldehyde resin with potassium muriate.

*Example I*

Samples of a dry commercial fertilizer grade potassium muriate of about 50 grams each were treated with 5 ml. of solution containing 0.012 gram of urea and about 0.012 gram of formaldehyde. These proportions represent about one pound of the resin per ton of the muriate. The solution was thoroughly mixed with the salt, and the mixtures were then thoroughly dried. The samples were placed in chambers of high humidity and alternately in chambers of low humidity. The samples treated with the urea-formaldehyde resins remained loose and friable, whereas samples which were not treated with the resin set up in hard masses or cakes.

A solution of urea and formaldehyde tends to polymerize as soon as it is formed, but by adding some caustic to bring the pH to about 9, the reaction is inhibited and the solution may be prepared and stored for some time. When correctly mixed, the solutions may last for several days without loss of effectiveness. The polymerization of the solution being brought about by the addition of acids, or by treating an acid salt.

The resin coating may be used on substantially any commercial chemical salt, and the quantities used vary, generally, from one to five pounds per ton. The amount of resin used, generally, being determined by the product, the size of particles, etc. The results at the lower amounts of resin are fully satisfactory, and in many instances lower amounts of the resin may be feasible.

Although the example describes in detail the use of urea-formaldehyde resins, other resins may be used as effectively. For example, phenol-formaldehyde resins have satisfactorily been used. Vinyl and acrylate resins with organic solvents incorporated with the salts will and appear to have similar behavior toward "set." The urea-formaldehyde resin is particularly adaptable to commercial processes because of low cost and since the solvent for the resin ingredients is water. Other resins, on the other hand, may require other solvents. So long as the solvent for the resin is not detrimental to the particular product, substantially any resin which dissolves in such a solvent may be used to provide a coating for the chemical salt. By applying the resin in a solution to a dried or substantially dried salt product, the individual grains of the salt are substantially coated with the resin. The process of coating the individual products lends itself readily to most commercial processes, since in the production of chemical salts there is, in general, a drying step at about the end of the production cycle. Wherever a process provides for a grinding step, the resin solution may be admixed with the salt product, and on drying, the salt is substantially coated with the resin.

Although the quantity of resin used is a very small fraction of salt, the resin substantially completely encloses each individual crystal or granule. The coating is, of course, very thin, amounting to only a film on the surface of the piece. Such a thin film or coating, however small, still provides sufficient protection for the crystals or granules for a substantial period. The coating, being thin, does not impair the utility of the particular salt.

The resins useful in the present application are synthetic resins substantially insoluble in the salt solvent or menstrua or carrier when polymerized or condensed. Soluble coatings, although of limited value in protecting the chemical salts, are not generally preferred for relatively long term storage of chemical salts. Soluble coatings, such as alkali resinate, which are generally resin derivatives are not intended to be included in the class of resins of the present application.

While the invention has been particularly described, there is no intention to limit the invention to the precise details so described, except insofar as limited by the appended claims.

I claim:

1. A treatment of crystalline or granular hygroscopic potassium salts to reduce caking tendencies thereof, comprising substantially coating the surface of the individual particles with a urea-formaldehyde resin.

2. A treatment of crystalline or granular hygroscopic potassium salts to reduce caking tendencies thereof, comprising substantially coating the surface of the individual particles with a phenol-formaldehyde resin.

3. A treatment of potassium muriate to reduce caking tendencies thereof, comprising mixing particles of the potassium muriate with an aqueous solution of urea and formaldehyde, and then drying the resultant mixture to form urea-formaldehyde resin coated individual particles of potassium muriate.

4. A treatment of potassium muriate to reduce caking tendencies thereof, comprising mixing particles of substantially dry granular potassium muriate with an aqueous solution of urea and formaldehyde, and drying the resultant mixture to form urea-formaldehyde resin coated individual particles of potassium muriate.

5. A treatment of crystalline or granular hygroscopic potassium salts to reduce caking tendencies thereof, comprising mixing particles of the potassium salts with an aqueous soultion of urea and formaldehyde at a pH of less than about 7.0 to polymerize the urea and formaldehyde so as to form a coating on the individual particles, and drying the resultant particles.

6. A potassium muriate product of reduced caking tendency including a thin urea-formaldehyde resin coating on each of the individual particles.

7. A potassium muriate product of reduced caking tendency including a thin phenol-formaldehyde resin coating on each of the individual particles.

8. A treatment of crystalline or granular hygroscopic potassium salts to reduce caking tendencies thereof, comprising substantially coating the surface of the individual particles with a thin coating of a resin selected from one of the class consisting of urea-formaldehyde and phenol-formaldehyde.

9. A potassium muriate product of reduced caking tendenices including a thin coating of a resin selected from one of the class consisting of urea-formaldehyde and phenol-formaldehyde on each of the individual particles thereof.

10. A potassium muriate product of reduced caking tendencies comprising agglomerated granules of fine potassium muriate particles coated with a resin selected from one of the class consisting of urea-formaldehyde and phenol-formaldehyde as a thin film on the individual particles thereof.

References Cited in the file of this patent

UNITED STATES PATENTS

| | | |
|---|---|---|
| 2,092,903 | Benner et al. | Sept. 14, 1937 |
| 2,155,499 | Lawson | Apr. 25, 1939 |
| 2,192,129 | Ellis | Feb. 27, 1940 |
| 2,234,484 | Weinig | Mar. 11, 1941 |
| 2,303,504 | Ryan | Dec. 1, 1942 |
| 2,312,214 | Howald et al. | Feb. 23, 1943 |
| 2,470,822 | Johnson et al. | May 24, 1949 |